UNITED STATES PATENT OFFICE.

WILLIAM R. LOVEMAN, OF LAKEWOOD, OHIO, ASSIGNOR, BY MESNE ASSIGNMENTS, TO NATIONAL CARBON COMPANY, INC., A CORPORATION OF NEW YORK.

PROCESS OF PURIFYING ZIRCONIUM ORES.

1,261,948.     Specification of Letters Patent.     Patented Apr. 9, 1918.

No Drawing.     Application filed August 18, 1915. Serial No. 46,041.

*To all whom it may concern:*

Be it known that I, WILLIAM R. LOVEMAN, a citizen of the United States, residing at Lakewood, in the county of Cuyahoga and State of Ohio, have invented a certain new and useful Improvement in Processes of Purifying Zirconium Ores, of which the following is a full, clear, and exact description.

Zirconium oxid and other compounds of zirconium find extensive use in the various industries, such as the manufacturing of arc lamp electrodes and the enameling industry; but all of these require that the zirconium compound be in a substantially pure condition. This precludes the use of any natural zirconium product and the prior processes of purifying zirconium ores have been so unsatisfactory that there have been numerous attempts to improve on these to the extent where the purification of the ore could be carried out in a practical, commercial way. As far as I know, however, no one prior to my invention had discovered a successful way of doing this. The manner in which I accomplish the desired result will now be explained.

The impure zirconium oxid, containing the oxid of silicon, titanium, iron and aluminum, is crushed to a fine powder and fused with sodium carbonate by heating to about 1000° C. This fusion brings about the following reactions:—

$$ZrO_2 + Na_2CO_3 = Na_2ZrO_3 + CO_2.$$
$$TiO_2 + Na_2CO_3 = Na_2TiO_3 + CO_2.$$
$$Fe_2O_3 + 3Na_2CO_3 + 3H_2O = 2Fe(OH)_3 + 3Na_2CO_3.$$
$$Al_2O_3 + 3Na_2CO_3 + 3H_2O = 2Al(OH)_3 + 3Na_2CO_3.$$
$$2Al(OH)_3 + 3Na_2CO_3 = 2Na_3AlO_3 + 3CO_2 + 3H_2O.$$
$$SiO_2 + Na_2CO_3 = Na_2SiO_3 + CO_2.$$

The fused mass after cooling is pulverized and placed with water into a suitable container through which steam is bubbled. This part of the process dissolves out the salts of aluminum and silicon, leaving behind the insoluble salts of zirconium, titanium and iron.

After the soluble salts have been leached out the insoluble salts are washed with water and treated with dilute hydrochloric acid (diluted in the ratio of 1 to 1) and allowed to settle. The hydrochloric acid acts on the compounds in accordance with the following equations:—

$$2Fe(OH)_3 + 6HCl = 2FeCl_3 + 6H_2O.$$
$$Na_2TiO_3 + 6HCl = TiCl_4 + 2NaCl + 3H_2O.$$
$$Na_2ZrO_3 + 2HCl = ZrO_2 \cdot H_2O + 2NaCl.$$

After having treated the mass with hydrochloric acid the resulting salts are all soluble with the exception of the zirconium hydrate. By filtering and washing the latter salt is readily separated from the others.

The zirconium hydrate is converted into the oxid by calcination and when this is done it will be found to be in a very pure condition.

A low proportion of sodium carbonate is insufficient to accomplish the desired result and the best proportion that I have found is 8 parts of sodium carbonate to 1 part of ore. Lower proportions of carbonate to ore of course can be used if an impure product is not objectionable, but proportions below 6 to 1 are entirely unsatisfactory for the removal of silica. The fusion should be continued for about two hours if a very pure product is desired, for with a shorter period of fusion a considerable part of the alumina and silica are left in the fused mass.

The finer the condition of the impure ore, the better will be the results obtained by the sodium carbonate fusion, and I have found that it is desirable to reduce the ore to a point where it will pass through a hundred mesh screen. (Opening of about 0.0055 inches.)

Of course the amount of impurities left in the fused carbonate mass, as well as in the hydrochloric acid mixture, will depend upon the care with which the same is leached or washed. The longer the leaching or washing, the purer the resulting product will be.

After the zirconium oxid resulting from the calcination is analyzed it has been found to contain only .15% silica, .20% titanium and .10% iron oxid. For most uses this would be considered a practically pure zirconium oxid, but if a still purer product is desired it can be obtained by the same process with a greater period of fusion and repeated treatment with hydrochloric acid and washing with water.

My process is not to be limited to the exact materials specified, as potassium carbonate might be employed, and other acids, such as sulfuric, might be substituted for the hydrochloric acid.

The process can also be used to obtain pure zirconium oxid from the mineral zirkon which is crude zirconium silicate. By fusing zirkon with an excess of sodium carbonate, the silica may be separated out from the zirconium salt, but in order to get a very pure product I have found that it is necessary to fuse twice with sodium carbonate. In order to remove the iron and titanium the residue may be treated with hydrochloric acid as previously outlined.

Having described my invention, what I claim is:—

1. The process of removing alumina and silica from impure zirconium ores, which consists in fusing the ores with sodium carbonate in a ratio greater than 1 to 6, and washing out the resulting soluble salts.

2. The process of removing silica and alumina from crude zirconium ores, which consists in crushing the ores, fusing with sodium carbonate in the ratio of 1 to 8, crushing the fused mass when cold, and leaching with hot water.

3. The process of purifying crude zirconium ores, which consists in fusing in an excess of sodium carbonate, crushing the fused mass, leaching out the soluble salts, treating the residue with dilute hydrochloric acid, washing and filtering, and then calcining the residue.

4. The process of purifying crude zirconium ores, which consists in crushing the same, fusing with sodium carbonate in a ratio greater than 1 to 6, crushing the fused mass, washing out the soluble salts, treating the residue with dilute hydrochloric acid, filtering and calcining the residue.

In testimony whereof, I hereunto affix my signature.

WILLIAM R. LOVEMAN.